(12) United States Patent
Chlepko

(10) Patent No.: US 10,720,793 B2
(45) Date of Patent: Jul. 21, 2020

(54) DISPOSABLE PACKAGE ASSEMBLY FOR BATTERIES WITH ADDED CHARGING FUNCTION

(71) Applicant: RLW VIRTUAL SOLUTIONS, LLC, Gainesville, GA (US)

(72) Inventor: Jiri Chlepko, Buford, GA (US)

(73) Assignee: RLW Virtual Solutions, LLC, Gainesville, GA (US)

( * ) Notice: Subject to any disclaimer, the term of this patent is extended or adjusted under 35 U.S.C. 154(b) by 0 days.

(21) Appl. No.: 16/441,420

(22) Filed: Jun. 14, 2019

(65) Prior Publication Data

US 2019/0334361 A1    Oct. 31, 2019

Related U.S. Application Data

(63) Continuation of application No. 15/718,237, filed on Sep. 28, 2017, now Pat. No. 10,367,362.

(60) Provisional application No. 62/411,059, filed on Oct. 21, 2016.

(51) Int. Cl.
*H02J 7/34* (2006.01)
*H02J 7/00* (2006.01)
*H01M 10/44* (2006.01)
*H01M 2/10* (2006.01)

(52) U.S. Cl.
CPC .......... *H02J 7/342* (2020.01); *H01M 2/1022* (2013.01); *H01M 10/44* (2013.01); *H01M 10/441* (2013.01); *H02J 7/0045* (2013.01); *H02J 7/00* (2013.01)

(58) Field of Classification Search
CPC ................ H02J 7/0054; H02J 7/0045; H02J 2007/0062; H01M 10/44; H01M 10/441; H01M 2/1022
USPC ........................................................ 320/103
See application file for complete search history.

(56) References Cited

U.S. PATENT DOCUMENTS

| 4,607,623 | A   | * | 8/1986  | Bauman .................. | A61B 1/267 362/217.05 |
| 5,733,674 | A   | * | 3/1998  | Law ...................... | H01M 2/105 320/125 |
| 6,261,508 | B1  | * | 7/2001  | Featherby ............. | H01L 23/055 257/E23.114 |
| 6,455,864 | B1  | * | 9/2002  | Featherby ............. | H01L 23/055 250/515.1 |
| 6,741,064 | B2  |   | 5/2004  | Liu et al. | |
| 7,259,539 | B2  |   | 8/2007  | Suzuki et al. | |
| 7,426,595 | B2  | * | 9/2008  | Osaka ............... | H04M 1/72527 710/304 |
| 7,445,157 | B2  | * | 11/2008 | Clegg .................. | A45C 11/182 235/486 |
| 7,755,323 | B2  |   | 7/2010  | Wu | |
| 8,078,339 | B2  | * | 12/2011 | Oakes ................. | H01M 10/441 701/1 |

(Continued)

*Primary Examiner* — M Baye Diao
(74) *Attorney, Agent, or Firm* — Roeder & Broder LLP; James P. Broder

(57) ABSTRACT

A commercial package assembly that retains a battery for sale to a consumer includes a battery chamber and a control assembly. The battery chamber retains the battery. The battery is visible to the consumer while the battery is retained within the battery chamber. The control assembly is coupled to the battery chamber. Additionally, the control assembly is configured to transmit power from the battery to an electronic device while the battery is retained within the battery chamber.

16 Claims, 6 Drawing Sheets

(56) References Cited

U.S. PATENT DOCUMENTS

| | | | | |
|---|---|---|---|---|
| 8,123,119 | B1* | 2/2012 | Gromley | G07C 9/00912 |
| | | | | 235/379 |
| 8,725,338 | B2* | 5/2014 | Tanaka | B60K 6/48 |
| | | | | 701/22 |
| 8,844,817 | B2* | 9/2014 | Glanzer | H02J 7/0044 |
| | | | | 235/449 |
| 8,947,040 | B2 | 2/2015 | Law | |
| 9,024,570 | B2 | 5/2015 | Workman et al. | |
| 9,071,058 | B2 | 6/2015 | Oku | |
| 9,805,534 | B2* | 10/2017 | Ho | G07C 9/00563 |
| 10,183,563 | B2* | 1/2019 | Rayner | B60K 1/04 |
| 10,367,362 | B2* | 7/2019 | Chlepko | H02J 7/0054 |
| 2004/0158350 | A1* | 8/2004 | Ostergaard | A61J 7/0481 |
| | | | | 700/231 |
| 2007/0182368 | A1 | 8/2007 | Yang | |
| 2009/0278493 | A1 | 11/2009 | Alden | |
| 2010/0110274 | A1* | 5/2010 | Reynolds | G06Q 20/105 |
| | | | | 348/360 |
| 2011/0000726 | A1* | 1/2011 | Tanaka | B60L 53/18 |
| | | | | 180/65.265 |
| 2011/0106697 | A1* | 5/2011 | Roberts | G06Q 20/3278 |
| | | | | 705/41 |
| 2012/0007553 | A1* | 1/2012 | Ichikawa | G07C 5/085 |
| | | | | 320/109 |
| 2014/0195826 | A1* | 7/2014 | Wojcik | G06F 21/86 |
| | | | | 713/300 |
| 2016/0368390 | A1* | 12/2016 | Yang | B60L 1/003 |
| 2017/0337788 | A1* | 11/2017 | Wu | G08B 13/1409 |
| 2018/0022226 | A1* | 1/2018 | Sjodin | B60L 53/60 |
| | | | | 701/22 |

* cited by examiner

DISPOSABLE PACKAGE ASSEMBLY FOR BATTERIES WITH ADDED CHARGING FUNCTION

RELATED APPLICATION

The present application is a continuation application and claims the benefit under 35 U.S.C. § 120 on pending U.S. patent application Ser. No. 15/718,237, filed on Sep. 28, 2017, and entitled "DISPOSABLE PACKAGE ASSEMBLY FOR BATTERIES WITH ADDED CHARGING FUNCTION." U.S. patent application Ser. No. 15/718,237 is related to and claims priority on U.S. Provisional Application Ser. No. 62/411,059, filed on Oct. 21, 2016, entitled "DISPOSABLE PACKAGE ASSEMBLY FOR BATTERIES WITH ADDED CHARGING FUNCTION". As far as permitted, the contents of U.S. patent application Ser. No. 15/718,237 and U.S. Provisional Application Ser. No. 62/411,059 are incorporated herein by reference.

BACKGROUND

Portable or mobile electronic devices, such as smartphones and tablets, have taken on an increased importance for many, many people in recent years. In fact, many people claim that they cannot function properly without them. However, such electronic devices can often lose power, i.e. drain the internal battery, more quickly and more frequently than desired. Thus, these electronic devices need to be recharged often. Unfortunately, the user of the electronic device is too often found in situations when and where conventional charging methods are not available, e.g., when traveling, at airports, during natural disasters or power outages, etc.

SUMMARY

The present invention is directed toward a commercial package assembly that retains a battery for sale to a consumer. In various embodiments, the commercial package assembly includes a battery chamber and a control assembly. The battery chamber retains the battery. The battery is visible to the consumer while the battery is retained within the battery chamber. The control assembly is coupled to the battery chamber. Additionally, the control assembly is configured to transmit power from the battery to an electronic device while the battery is retained within the battery chamber.

In some embodiments, the battery chamber is formed at least in part from polyvinyl chloride. Additionally, in certain embodiments, at least a portion of the battery chamber is transparent.

In certain embodiments, the control assembly includes a controller and a connector assembly, the connector assembly electrically connecting the controller to the electronic device. In some such embodiments, the connector assembly includes one of a female USB port-type connector, a male USB port-type connector, a lighting connector, and a USB type-C connector.

Additionally, the commercial package assembly can further include an access inhibitor that is selectively positionable adjacent to the connector assembly to selectively inhibit access to the connector assembly.

In some embodiments, the battery chamber is formed by a first package member and a second package member that is coupled to the first package member.

The present invention is further directed toward a charging assembly including the commercial package assembly as described above, and a battery that is retained within the battery chamber. In certain embodiments, the charging assembly further includes a battery connector assembly that electrically connects the battery to the control assembly. In one such embodiment, the battery connector assembly includes conductive coating that is positioned within the battery chamber adjacent to battery terminals on both ends of the battery to provide contact pressure to the battery terminals on both ends of the battery.

Additionally, the charging assembly can further include a charge activator that is configured to selectively enable power to be transmitted from the battery to the control assembly. The charge activator is selectively movable between a closed position, wherein power is inhibited from being transmitted from the battery to the control assembly, and an open position, wherein power is enabled to be transmitted from the battery to the control assembly. In one embodiment, the charge activator includes an activation pull strip that is positioned between one of the battery terminals of the battery and the battery connector assembly.

In certain applications, the present invention is further directed toward a method for retaining a battery for sale within a commercial package assembly, the method including the steps of (A) retaining the battery within a battery chamber, the battery being visible to the consumer while the battery is retained within the battery chamber; (B) coupling a control assembly to the battery chamber; and (C) transmitting power from the battery to an electronic device with the control assembly while the battery is retained within the battery chamber.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a disposable package assembly that is configured to retain and display one or more common household batteries for commercial purposes, and that is further usable for charging portable and/or mobile electronic devices. More particularly, in certain embodiments, the disposable package assembly is a commercial package assembly that is configured to provide an attractive marketing display for the household batteries in addition to providing the portable charging station for any suitable portable and/or mobile electronic devices. As utilized herein, a "commercial package assembly" is a package assembly that is configured to retain one or more products for purposes of having a consumer purchase the one or more products that are retained therein.

Those of ordinary skill in the art will realize that the following detailed description of the present invention is illustrative only and is not intended to be in any way limiting. Other embodiments of the present invention will readily suggest themselves to such skilled persons having the benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
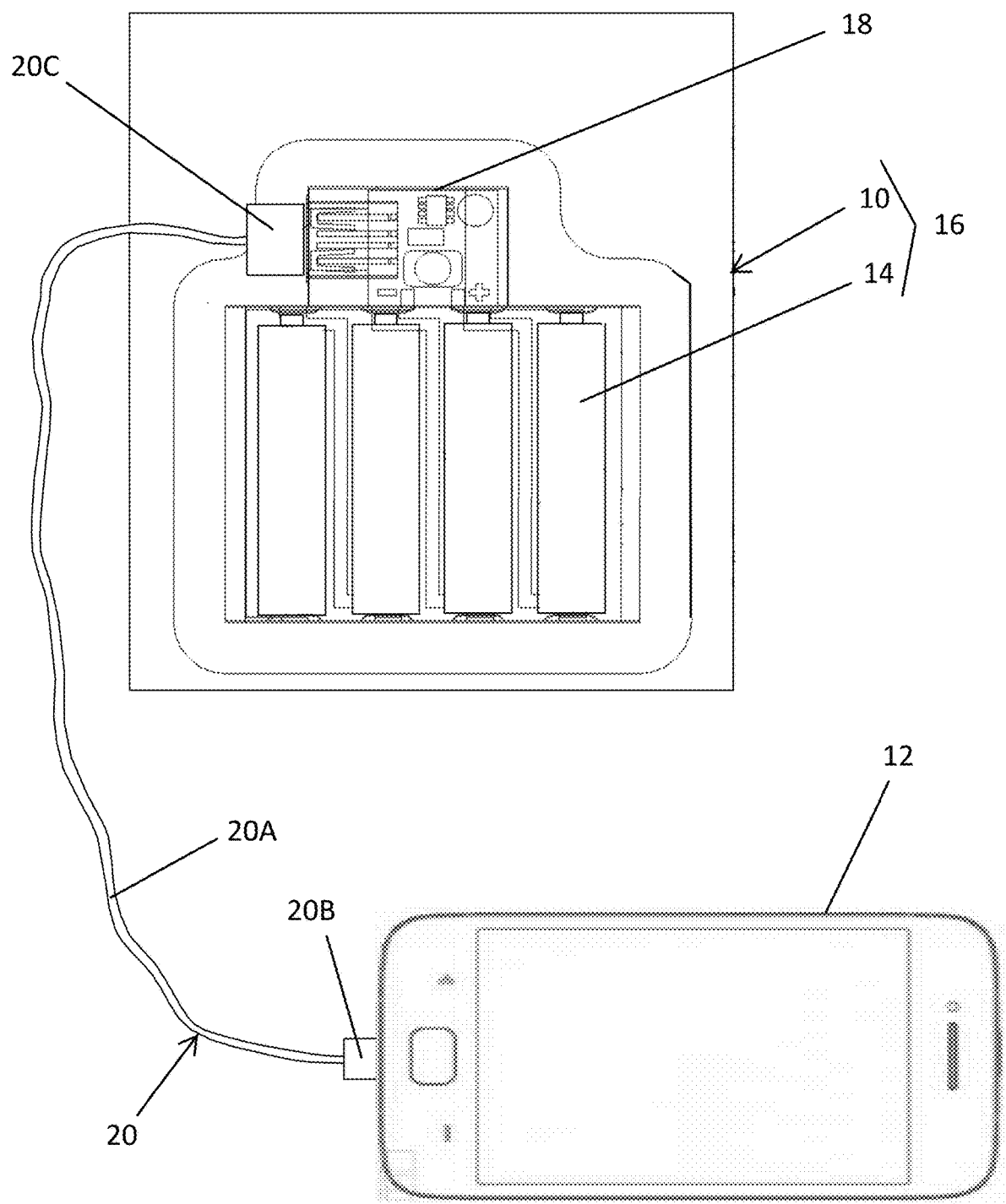
FIG. 1 is a simplified schematic front view illustration of an embodiment of a disposable package assembly having features of the present invention, and an electronic device that is being charged via the disposable package assembly.

FIG. 1 is a simplified schematic front view illustration of an embodiment of a disposable package assembly 10 (also referred to herein simply as a "package assembly") having features of the present invention, and an electronic device 12 (e.g., a smartphone, a tablet computer, a laptop computer, a portable battery pack, etc.) that is electrically coupled to and is being charged via the package assembly 10. As illustrated, the package assembly 10 is usable for receiving, retaining and displaying one or more household batteries 14, e.g., for marketing and/or sales purposes. For example, the package assembly 10 can be configured to retain and display one or more AA, AAA, AAAA, C, D, or 9V batteries, as non-exclusive examples, or other household batteries. Alternatively, the package assembly 10 can be configured to retain and display one or more rechargeable batteries of any suitable type. Additionally, as provided in detail herein, the package assembly 10 is further configured to utilize the one or more household batteries 14 for purposes of charging the electronic device 12.

As utilized herein, the package assembly 10 and the batteries 14 can be referred to herein collectively as a charging assembly 16. As an overview, the package assembly 10 is configured to utilize the power of the one or more batteries 14 to effectively and portably charge the electronic device 12. More specifically, as provided in detail herein below, the package assembly 10 includes a control assembly 18 that is configured to utilize the power from the one or more batteries 14 to selectively charge or recharge the electronic device 12. Stated in another manner, in some embodiments, the control assembly 18 is configured to selectively transmit energy from the one or more batteries 18 to the electronic device 12 to selectively charge the electronic device 12.

As shown in FIG. 1, the electronic device 12 is electrically connected to the package assembly 10 via a charging coupler 20. The charging coupler 20 is electrically connected to and extends between the electronic device 12 and the control assembly 18 of the package assembly 10. The design of the charging coupler 20 can be varied to suit the requirements of the package assembly 10 and/or the electronic device 12. For example, in one non-exclusive embodiment, as shown in FIG. 1, the charging coupler 20 can include a conductor 20A, e.g., a conductive wire, a first coupling member 20B, and a second coupling member 20C. Alternatively, the charging coupler 20 can have any other suitable design.

In the embodiment illustrated in FIG. 1, the first coupling member 20B electrically couples the conductor 20A to the electronic device 12. Somewhat similarly, the second coupling member 20C electrically couples the conductor 20A to the control assembly 18 of the package assembly 10. The first coupling member 20B and the second coupling member 20C can have any suitable design. For example, in one non-exclusive alternative embodiment, each of the first coupling member 20B and the second coupling member 20C can include a male USB port-type connector. Alternatively, one or both of the coupling members 20B, 20C can include female USB port-type connectors, lighting connectors (e.g., Apple® lighting connectors), USB-type C connectors, or another suitable type of electrical connector known to those skilled in the art.

Figure 2:
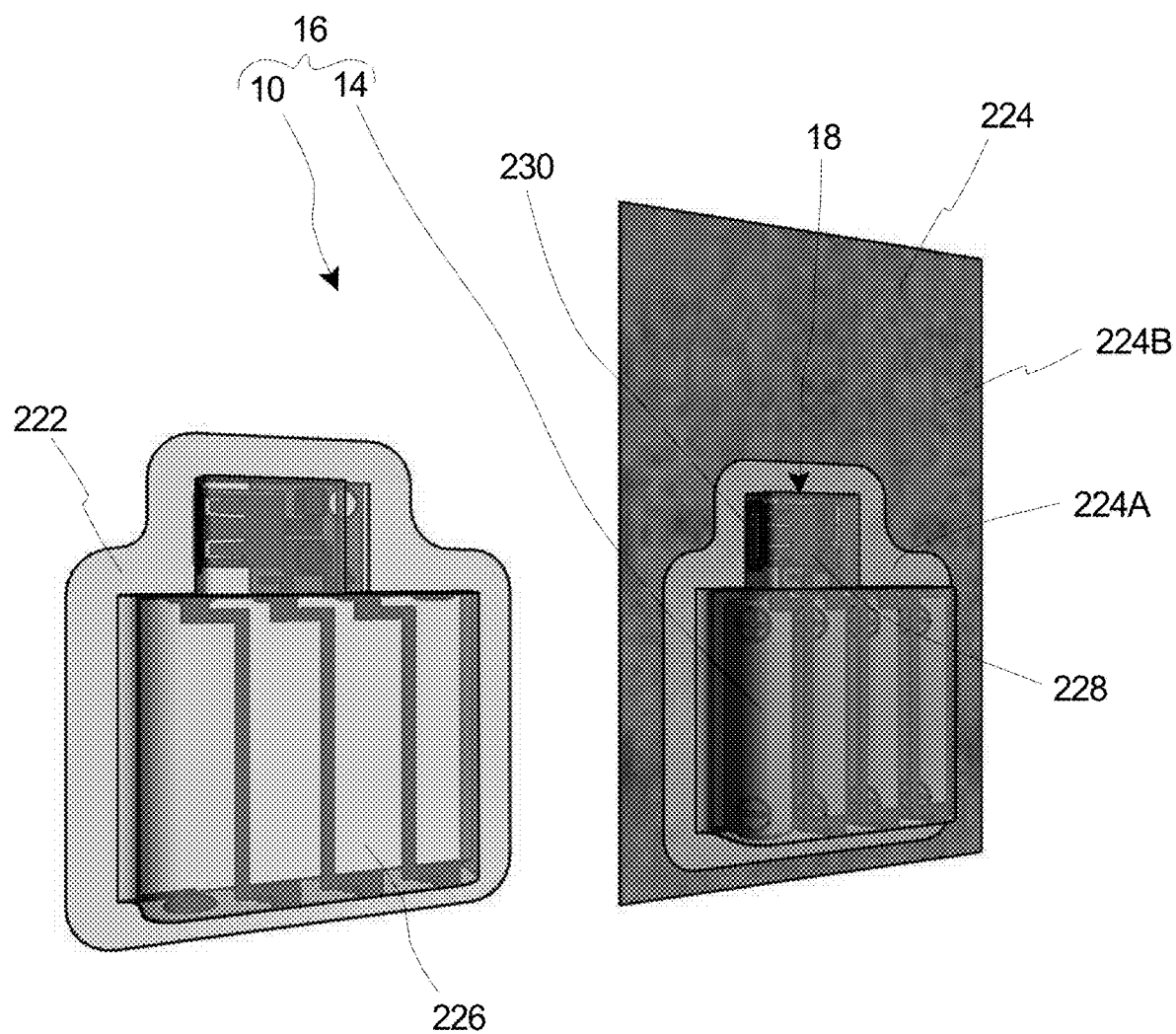
FIG. 2 is a simplified schematic, partially exploded illustration of the disposable package assembly illustrated in FIG. 1.

FIG. 2 is a simplified schematic, partially exploded illustration of the disposable package assembly 10 illustrated in FIG. 1. The design of the package assembly 10 can be varied. For example, as illustrated in FIG. 2, the package assembly 10 can include a first package member 222, a second package member 224, and the control assembly 18. Alternatively, the package assembly 10 can have another suitable design, and/or can include more components or fewer components than those specifically illustrated in FIG. 2. In particular, in certain non-exclusive alternative embodiments, the package assembly 10 can be designed without the first package member 222 and/or without the second package member 224.

As illustrated in this embodiment, the first package member 222 and the second package member 224 can cooperate to form a battery chamber 226 (or battery cavity) for receiving and retaining the one or more batteries 14 (illustrated in FIG. 1). Stated in another manner, in certain embodiments, each of the first package member 222 and the second package member 224 are configured to form at least a portion of the battery chamber 226. As provided herein, the first package member 222 and the second package member 224 can cooperate to form the battery chamber 226 of any suitable size. For example, in certain non-exclusive alternative embodiments, the battery chamber 226 can be sized to receive and retain one or more AA, AAA, AAAA, C, D, or 9V batteries, as non-exclusive examples. Alternatively, the battery chamber 226 can be sized to receive and retain other types of batteries, e.g., rechargeable batteries, of any suitable type.

It is appreciated that in embodiments that only include a single package member, i.e. without one of the first package member 222 and the second package member 224, the single package member can be configured to unilaterally form the battery chamber 226.

Additionally, it is appreciated that the battery chamber 226 can be sized to receive and retain any suitable number of batteries 14. For example, in the embodiment specifically shown in FIG. 2, the battery chamber 226 is sized to receive four batteries 14. Alternatively, the battery chamber 226 can be sized to receive and retain greater than four or fewer than four batteries 14.

Further, as provided herein, the control assembly 18 can be configured to selectively transmit energy from the one or more batteries 14 to the electronic device 12 (illustrated in FIG. 1) to charge the electronic device 12 while the one or more batteries 14 are positioned within the battery chamber 226.

The first package member 222 and the second package member 224 can be formed from any suitable materials. For example, in certain embodiments, the package members 222, 224 can include a disposable plastic blister, paperback packaging used in and for numerous consumer products. More specifically, in some such embodiments, the package members 222, 224 can be formed from vacuum-formed polyvinyl chloride (PVC), with at least one of the package members 222, 224 including paperback packaging. For example, as shown in FIG. 2, the first package member 222 includes a single plastic component that forms a portion of the battery chamber 226; and the second package member 224 includes a plastic, first component 224A, and a second component 224B that can include paperback packaging. Alternatively, in certain embodiments, both of the first component 224A and the second component 224B of the second package member 224 can be formed from a suitable plastic material. In some such embodiments, the second package member 224 can be formed as a single, integrally formed component.

In certain embodiments, at least a portion (i.e. some or all) of the first package member 222 and/or the second package member 224 can be transparent and/or colorless so that the contents of the battery chamber 226 can be viewed even when the battery chamber 226 is unopened.

In certain embodiments, as shown and described herein, the package members 222, 224 can be manufactured as separate components of the package assembly 10 that can be selectively connected to one another. Alternatively, the package members 222, 224 can be integrally formed with one another.

It is understood that the use of the terms "first package member" and "second package member" is merely for convenience and ease of discussion. Therefore, it is recognized that either of the package members 222, 224 can be the "first package member" and/or the "second package member".

The control assembly 18 is configured to control the charging capabilities of the package assembly 10 and/or the charging assembly 16. As provided herein, the design of the control assembly 18 can be varied. For example, as illustrated, in certain embodiments, the control assembly 18 can include a controller 228 (i.e. a control board or a printed circuit board) and a connector assembly 230 that enables electrical connection with the charging coupler 20 (illustrated in FIG. 1) and/or the electronic device 12 (illustrated in FIG. 1).

The controller 228 can be coupled to the first package member 222 and/or the second package member 224. The controller 228 provides the necessary and desired circuitry for purposes of utilizing the power of the batteries 14 to selectively charge the electronic device 12. In particular, the controller 228 can include circuitry that is printed or glued into the blister part of the package assembly 10 and connected to a control board. For example, in some non-exclusive alternative embodiments, the controller 228 can be configured to accommodate an input of between approximately three volts and six volts, and generate an output of approximately five volts, such as can be found in a standard USB port. Alternatively, the controller 228 can be configured to accommodate an input of greater than six volts or less than three volts, and to generate an output of greater than five or less than five volts.

As noted, the connector assembly 230 enables the desired electrical connection with the charging coupler 20 and/or the electronic device 12. Additionally, the connector assembly 230 and the charging coupler 20 are configured to be electrically connectable and compatible with one another. As such, the design of the connector assembly 230 can be varied to suit the specific design of the charging coupler 20, e.g., the specific design of the second coupling member 20C of the charging coupler 20. For example, in certain embodiments, if the second coupling member 20C of the charging coupler 20 includes a male USB port-type connector, then the connector assembly 230 can include a female USB port-type connector that is configured to receive the second coupling member 20C of the charging coupler 20. Alternatively, the connector assembly 230 can include a male USB port-type connector, a lighting connector (e.g., an Apple® lighting connector), a USB-type C connector, or another suitable type of connector. Additionally, it is appreciated that the connector assembly 230 can be any suitable size to be properly electrically coupled with the charging coupler 20.

Further, it is also recognized that the control assembly 18 can be utilized to selectively charge the portable electronic device 12 regardless of the number of batteries 14 that are actually retained within the package assembly 10 at any given time, i.e. so long as there is at least one battery 14 of sufficient strength that is being retained within the package assembly 10. It is further understood that the rate of the charging capabilities of the control assembly 18 may be impacted by the number of batteries 14, the type of batteries 14, and the potential previous usage of and age of the batteries 14 that are being retained within the package assembly 10.

Additionally, as provided herein, one or more of the batteries 14 can be individually removed from the package assembly 10 at any time and for use for any suitable and desired purposes. For example, in one non-exclusive application, a consumer can purchase a charging assembly 16 and then use the charging assembly 16 to charge an electronic device such as a smartphone. Subsequently, the user can then remove one or more batteries 14 from the package assembly 10 to use within any suitable devices and in any suitable manner.

Figure 3:
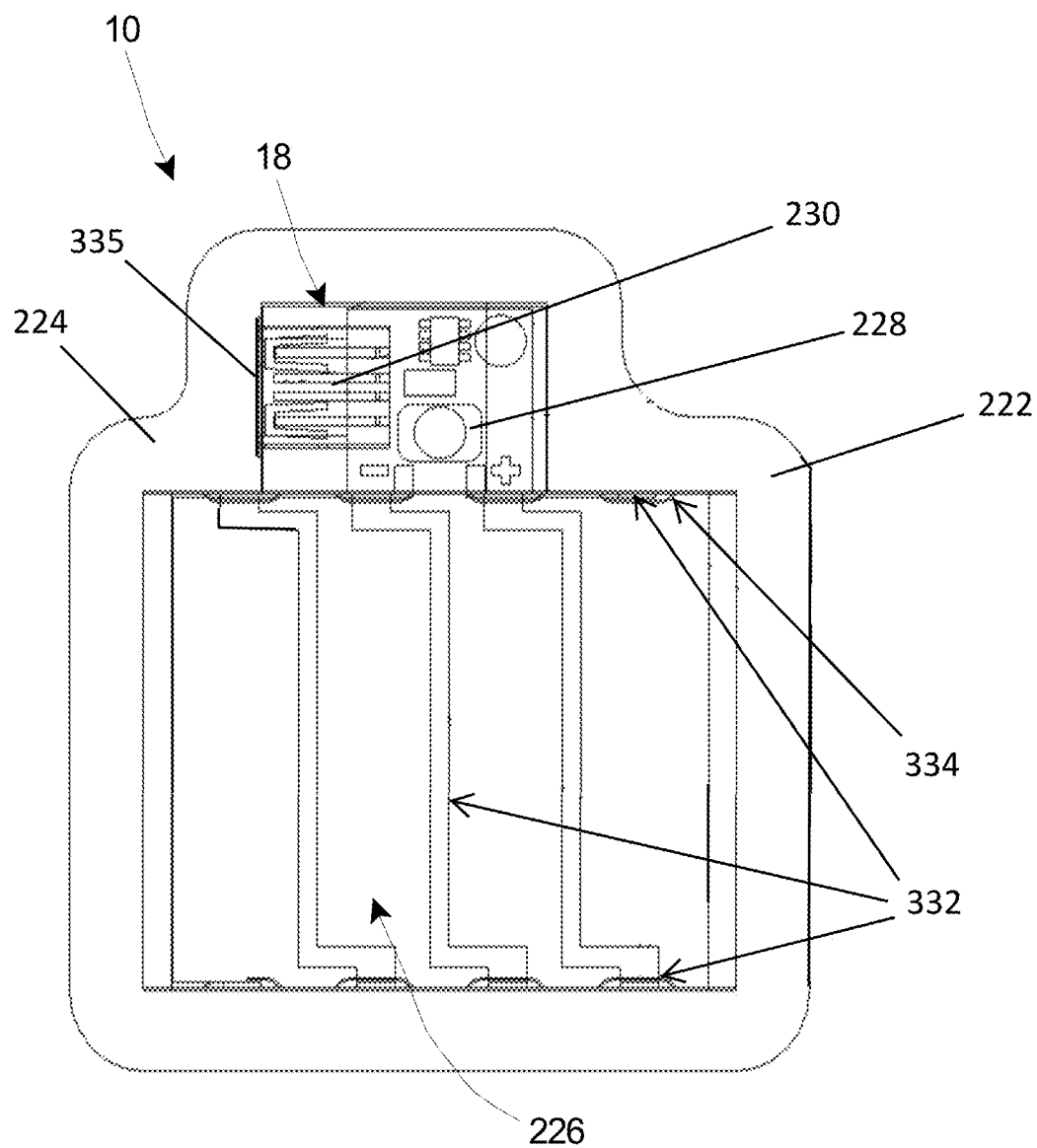
FIG. 3 is a simplified schematic front view illustration of a portion of the disposable package assembly illustrated in FIG. 1.

FIG. 3 is a simplified schematic front view illustration of a portion of the disposable package assembly 10 illustrated in FIG. 1. In particular, FIG. 3 illustrates certain additional features of the package assembly 10 that can be utilized for selectively charging the portable electronic device 12 (illustrated in FIG. 1) as desired.

As shown, FIG. 3 again illustrates the first package member 222 and the second package member 224 (although the second component 224B of the second package member 224 is not shown in FIG. 3), which can be formed of PVC or similar-type blister packaging. Additionally, FIG. 3 again illustrates that the control assembly 18 can include the controller 228 (e.g., the control board) and the connector assembly 230 (e.g., the female USB port-type connector).

FIG. 3 further illustrates that the one or both package members 222, 224 of the package assembly 10 can further include a battery connector assembly 332 for use with each of the batteries 14 (illustrated in FIG. 1) retained within the package assembly 10. The battery connector assembly 332 provides the desired and necessary electrical connection between the battery 14 and the control system 18, i.e. between the battery 14 and the controller 228. For example, in the embodiment illustrated in FIG. 3, the battery connector assembly 332 includes conductive coating (circuitry) on vacuum formed dents within the battery chamber 226 formed by the package members 222, 224 adjacent to the battery terminals on both ends of each battery 14 to provide contact pressure, as well as necessary circuitry to transmit the power from the battery 14 to the controller 228. Alternatively, the battery connector assembly 332 can have a different design.

Additionally, FIG. 3 also illustrates that the package assembly 10 can include a charge activator 334 that can be coupled to one or both of the package members 222, 224. The charge activator 334 is configured to selectively enable power to be transmitted from the batteries 14 to the control system 18, i.e. to the controller 228. In one non-exclusive embodiment, the charge activator 334 can include an activation pull strip that is located between the battery terminals and the battery connector assembly 332, i.e. the conductive contacts of the packaging. More specifically, when the charge activator 334 is in its normal (closed) position, i.e. between the battery terminals and the battery connector assembly 332, the charge activator 334 inhibits power from being transmitted from the batteries 14 to the controller 228. However, when the charge activator 334 is moved to an open position, i.e. where it is no longer between the battery terminals and the battery connector assembly 332, the charge activator 334 enables (i.e. no longer inhibits) power to be transmitted from the batteries 14 to the controller 228. Alternatively, the charge activator 334 can have another suitable design.

Still further, in certain embodiments, as shown in FIG. 3, the package assembly 10 can also include an access inhibitor 335, e.g., a cover and/or a seal, that selectively inhibits access to the connector assembly 230. More specifically, in some such embodiments, the access inhibitor 335 can include a cover that is positionable in a closed position wherein the access inhibitor 335 is positioned adjacent to the connector assembly 230 so as to extend over and/or seal off the connector assembly 230 such that the second coupling member 20C (illustrated in FIG. 1) of the charging coupler 20 (illustrated in FIG. 1) cannot be electrically connected to the connector assembly 230. With such positioning of the access inhibitor 335, some embodiments of the package assembly 10 can incorporate a waterproof and/or water-resistant design. Subsequently, when it is desired to utilize the charging capabilities of the package assembly 10, the access inhibitor 335 can be removed or otherwise moved to an open position wherein the second coupling member 20C of the charging coupler 20C can be electrically connected to the connector assembly 230 for purposes of charging the electronic device 12 (illustrated in FIG. 1).

Figure 4:
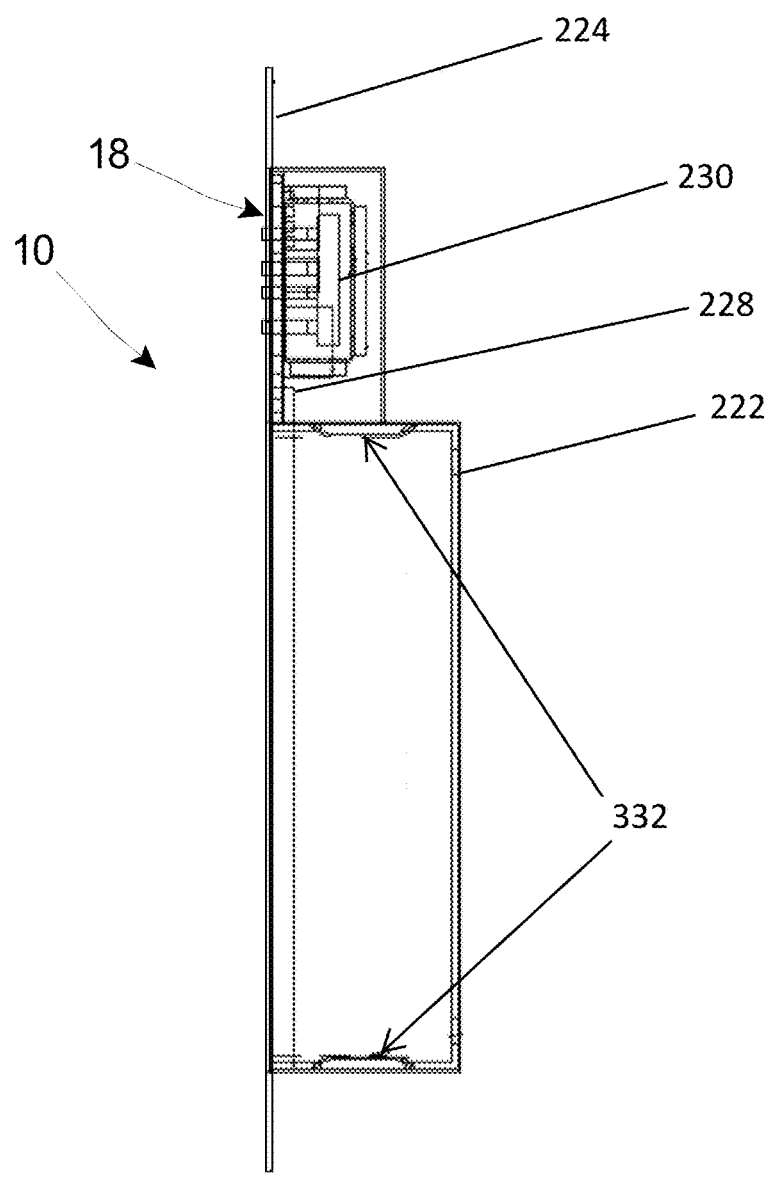
FIG. 4 is a simplified schematic side view illustration of the disposable package assembly illustrated in FIG. 1.

FIG. 4 is a simplified schematic side view illustration of the disposable package assembly 10 illustrated in FIG. 1. In particular, FIG. 4 again illustrates the package members 222, 224, the controller 228 and the connector assembly 230 of the control system 18, as well as a portion of the battery connector assembly 332.

Figure 5:
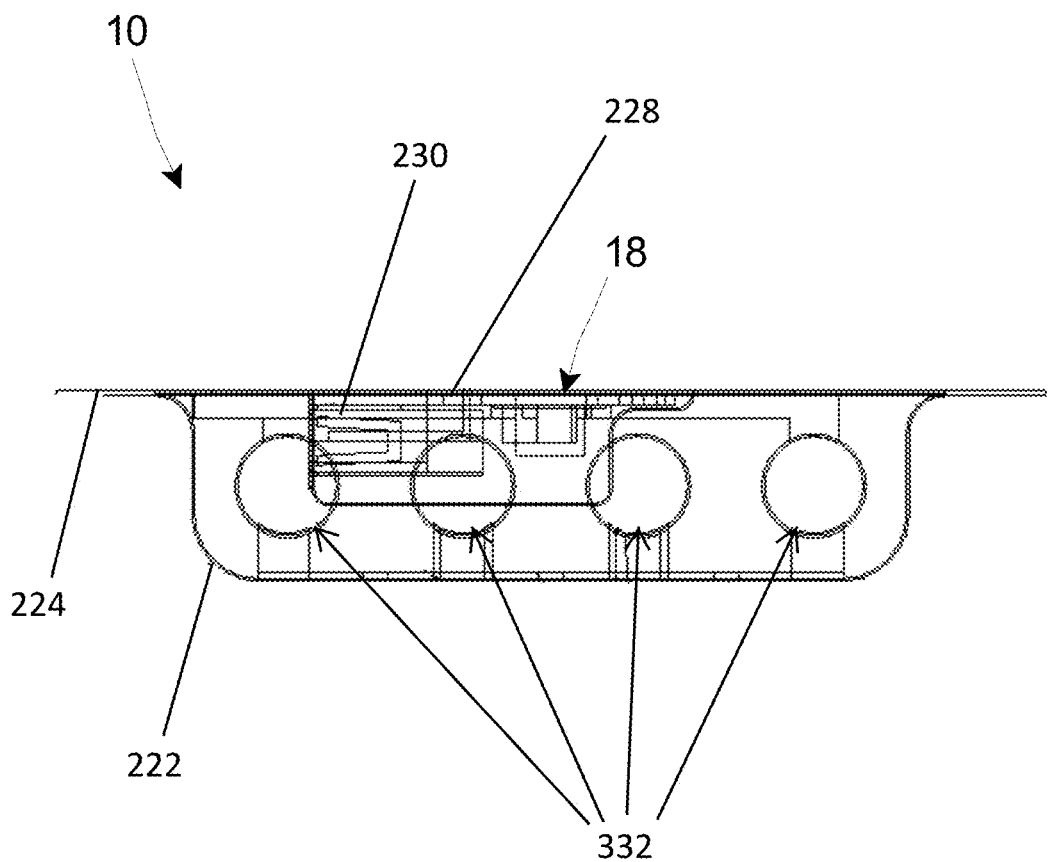
FIG. 5 is a simplified schematic top view illustration of the disposable package assembly illustrated in FIG. 1.

FIG. 5 is a simplified schematic top view illustration of the disposable package assembly 10 illustrated in FIG. 1. In particular, FIG. 5 yet again illustrates that the package assembly 10 includes the package members 222, 224, the controller 228 and the connector assembly 230 of the control system 18, as well as a portion of the battery connector assembly 332.

Figure 6:
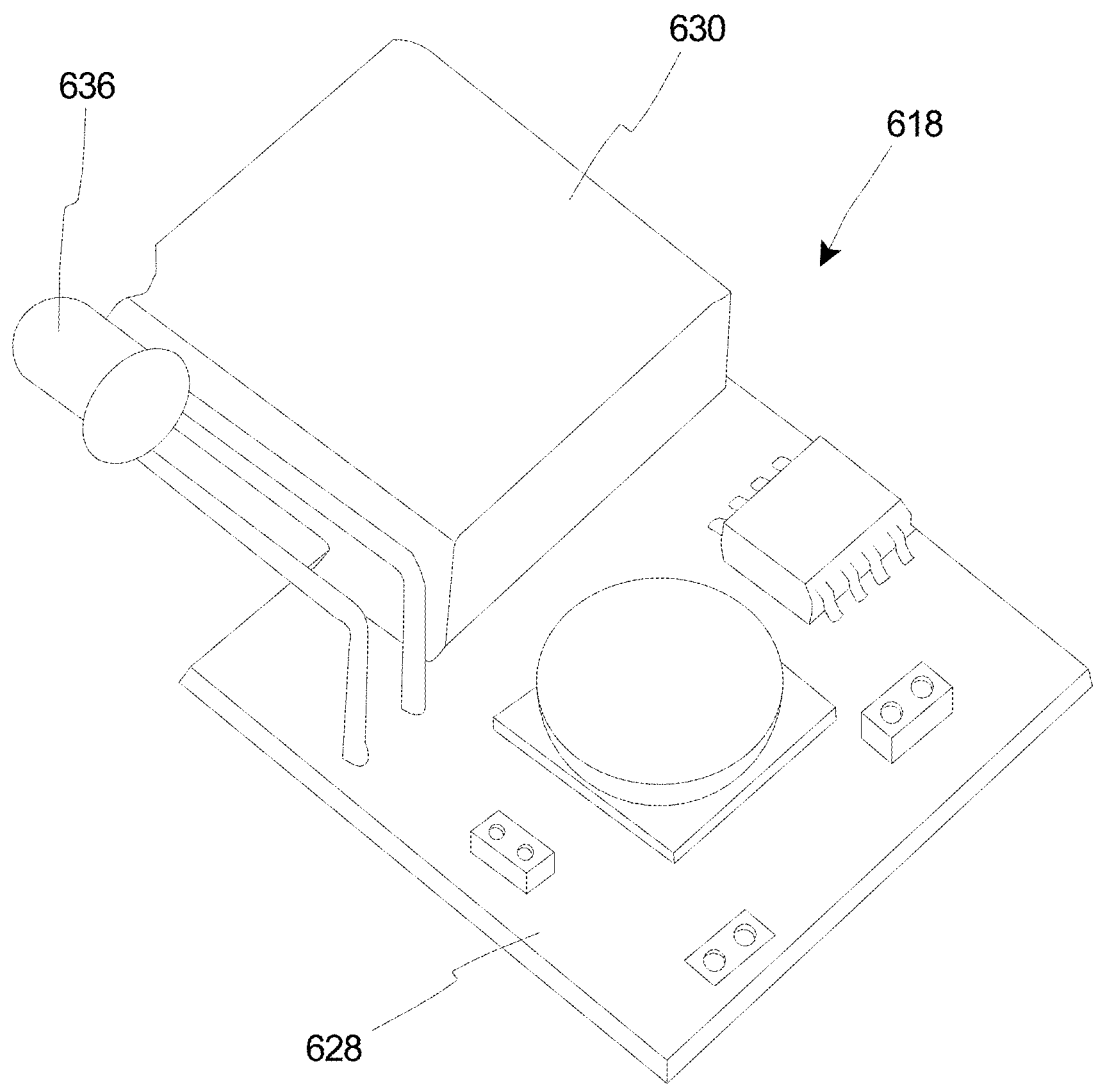
FIG. 6 is a simplified schematic perspective view illustration of an embodiment of a control assembly usable as part of the disposable package assembly.

FIG. 6 is a simplified schematic perspective view illustration of an embodiment of the control assembly 618 usable as part of the disposable package assembly 10 illustrated in FIG. 1. In particular, FIG. 6 illustrates in greater detail certain aspects of the control assembly 618 that can be included within the controller 628 and the connector assembly 630. Additionally, FIG. 6 also illustrates that the control assembly 618 can further include a charging status indicator 636, e.g., an optional LED charging status light that provides an indication of when charging has been enabled for the electronic device 12 (illustrated in FIG. 1).

In summary, in various embodiments, the present invention discloses a disposable plastic blister, paperback packaging known from numerous consumer products, with added circuitry and connector assembly, e.g., female USB port-type connector, to convert household batteries (AA, AAA, AAAA, 9V, C, D, rechargeable batteries or other) into a disposable and portable charger for small consumer electronic devices like cell phones and tablets. With this design, the package assembly 10 provides a cost-effective, disposable alternative for charging electronic devices, such as during traveling, while at airports, during natural disasters (e.g., hurricanes, floods, wildfires, earthquakes, etc.) or power outages, etc. Further, the package assembly 10 can be provided to those who may need it via any suitable method, e.g., airdrop, when more conventional methods are not necessarily available. Additionally, the package assembly 10 can use well-established and extended retail systems and locations of household batteries to add the desired function of portable charging.

It is understood that although a number of different embodiments of a package assembly 10 have been described herein, one or more features of any one embodiment can be combined with one or more features of one or more of the other embodiments, provided that such combination satisfies the intent of the present invention.

While a number of exemplary aspects and embodiments of the package assembly 10 have been shown and/or disclosed herein above, those of skill in the art will recognize certain modifications, permutations, additions and sub-combinations thereof. It is therefore intended that the system and method shall be interpreted to include all such modifications, permutations, additions and sub-combinations as are within their true spirit and scope, and no limitations are intended to the details of construction or design herein shown.

What is claimed is:

1. A charging assembly comprising:
a battery including battery terminals;
a commercial package assembly that retains the battery for sale of the battery to a consumer, the commercial package assembly including (i) a battery chamber that retains the battery, the battery being visible to the consumer while the battery is retained within the battery chamber; and (ii) a control assembly that is coupled to the battery chamber, the control assembly being configured to transmit power from the battery to an electronic device while the battery is retained within the battery chamber;
a battery connector assembly that electrically connects the battery to the control assembly; and
a charge activator that is configured to selectively enable power to be transmitted from the battery to the control assembly;
wherein the charge activator is selectively movable between a closed position wherein power is inhibited from being transmitted from the battery to the control assembly, and an open position wherein power is enabled to be transmitted from the battery to the control assembly; and wherein the charge activator includes an activation pull strip that is positioned between one of the battery terminals of the battery and the battery connector assembly.

2. The charging assembly of claim 1 wherein the battery chamber is formed at least in part from polyvinyl chloride.

3. The charging assembly of claim 1 wherein at least a portion of the battery chamber is transparent.

4. The charging assembly of claim 1 wherein the control assembly includes a controller and a connector assembly, the connector assembly electrically connecting the controller to the electronic device.

5. The charging assembly of claim 4 wherein the connector assembly includes one of a female USB port-type connector, a male USB port-type connector, a lighting connector, and a USB type-C connector.

6. The charging assembly of claim 4 further comprising an access inhibitor that is positionable adjacent to the connector assembly to selectively inhibit access to the connector assembly.

7. The charging assembly of claim 1 wherein the battery chamber is formed by a first package member and a second package member that is coupled to the first package member.

8. The charging assembly of claim 1 wherein the battery connector assembly includes conductive coating that is positioned within the battery chamber adjacent to the battery terminals on both ends of the battery to provide contact pressure to the battery terminals on both ends of the battery.

9. A commercial package assembly that retains a battery for sale to a consumer, the battery including battery terminals, the commercial package assembly comprising:
a battery chamber that retains the battery;
a control assembly that is coupled to the battery chamber, the control assembly being configured to transmit power from the battery to an electronic device while the battery is retained within the battery chamber;
a battery connector assembly that electrically connects the battery to the control assembly; and
a charge activator that is configured to selectively enable power to be transmitted from the battery to the control assembly, the charge activator including an activation pull strip that is positioned between one of the battery terminals of the battery and the battery connector assembly.

10. The commercial package assembly of claim 9 wherein the charge activator is selectively movable between a closed position wherein power is inhibited from being transmitted from the battery to the control assembly, and an open position wherein power is enabled to be transmitted from the battery to the control assembly.

11. The commercial package assembly of claim 9 wherein the battery is visible to the consumer while the battery is retained within the battery chamber.

12. The commercial package assembly of claim 9 wherein the control assembly includes a controller and a connector assembly, the connector assembly electrically connecting the controller to the electronic device.

13. The commercial package assembly of claim 12 wherein the connector assembly includes one of a female USB port-type connector, a male USB port-type connector, a lighting connector, and a USB type-C connector.

14. The commercial package assembly of claim 12 further comprising an access inhibitor that is positionable adjacent to the connector assembly to selectively inhibit access to the connector assembly.

15. The commercial package assembly of claim 9 wherein the battery chamber is formed by a first package member and a second package member that is coupled to the first package member.

16. The commercial package assembly of claim 9 wherein the battery connector assembly includes conductive coating that is positioned within the battery chamber adjacent to the battery terminals on both ends of the battery to provide contact pressure to the battery terminals on both ends of the battery.

* * * * *